United States Patent
Hashimoto et al.

(10) Patent No.: US 6,879,066 B2
(45) Date of Patent: Apr. 12, 2005

(54) LINEAR MOTOR

(75) Inventors: Akira Hashimoto, Tokyo (JP); Yasuki Kimura, Tokyo (JP); Yuji Nakahara, Tokyo (JP); Akira Watarai, Tokyo (JP); Shoichiro Nishitani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/774,467

(22) Filed: Feb. 10, 2004

(65) Prior Publication Data

US 2004/0155535 A1 Aug. 12, 2004

Related U.S. Application Data

(62) Division of application No. 10/410,135, filed on Apr. 10, 2003, now Pat. No. 6,747,376.

(30) Foreign Application Priority Data

Apr. 23, 2002 (JP) ........................................ 2002-119983
Dec. 20, 2002 (JP) ........................................ 2002-369112

(51) Int. Cl.$^7$ ............................................. H02K 41/00
(52) U.S. Cl. .............................. 310/12; 310/13; 310/15
(58) Field of Search .............................. 310/12, 13, 15

(56) References Cited

U.S. PATENT DOCUMENTS 5,854,521 A * 12/1998 Nolle ........................... 310/12
6,087,742 A * 7/2000 Maestre ........................ 310/12
6,528,907 B2 * 3/2003 Hwang et al. ................ 310/12

FOREIGN PATENT DOCUMENTS

| JP | 2000-217334 | 8/2000 |
| JP | 2001-145327 | 5/2001 |
| JP | 2002-095232 | 3/2002 |

* cited by examiner

Primary Examiner—Darren Schuberg
Assistant Examiner—Iraj A. Mohandesi
(74) Attorney, Agent, or Firm—Burns, Doane, Swecker & Mathis, L.L.P.

(57) ABSTRACT

A linear motor comprises a stator including a stator yoke and a plurality of permanent magnets arranged side by side on the stator yoke along a motor running direction in alternately reversed directions to produce alternating polarities, and a moving part including a plurality of magnetic teeth arranged along the motor running direction and coils wound around the individual magnetic teeth. Cutouts formed in end surfaces of yoke portions of the individual magnetic teeth opposite to their side facing the stator line up to form a groove-shaped channel running through the yoke portions of the successive magnetic teeth, and the multiple magnetic teeth are joined together into a single structure by fitting a connecting bar in the groove-shaped channel.

1 Claim, 15 Drawing Sheets

LINEAR MOTOR

This application is a divisional of application Ser. No. 10/410,135, filed April 10, 2003, now U.S. Pat. No. 6,747,376.

BACKGROUND OF THE INVENTION

1. Field of the Invention

The present invention relates to a linear motor. More particularly, the invention pertains to a linear motor used in a table feed mechanism of a machine tool.

2. Description of the Background Art

FIG. 20 is a cross-sectional diagram showing the construction of a conventional linear motor disclosed in Japanese Laid-open Patent Publication No. 2000-217334.

Referring to FIG. 20, a stator 1 includes a plurality of permanent magnets 3a, 3b arranged in a line at regular intervals on a stator yoke 2 in alternately reversed directions to produce alternating polarities. A moving part 4 moves along the stator 1 as if sliding over the stator 1 with a specific distance (gap) therefrom.

The moving part 4 includes a moving yoke 5, connecting parts 7 each having a trapezoidal cross section which are held at specific intervals on one side of the moving yoke 5 facing the stator 1 by bolts 6 fitted in the moving yoke 5, a plurality of magnetic teeth (poles) 8 generally T-shaped in cross section and joined to the individual connecting parts 7 which are fitted into dovetail grooves 8a formed in a central part of each tooth end, each magnetic tooth 8 having a recess 8b and a protrusion 8c formed on opposite sides, and a plurality of magnetic teeth (poles) 9 generally I-shaped in cross section and fitted between the successive magnetic teeth 8 as a recess 9a and a protrusion 9b formed on opposite sides of each magnetic tooth 9 fit over and into the protrusion 8c and the recess 8b of the adjoining magnetic teeth 8, respectively. Also included in the moving part 4 are coils 10 individually wound around the magnetic teeth 8, 9 and a resin molding 11 surrounding the magnetic teeth 8, 9 and the coils 10 to join them together into a single structure.

In the conventional linear motor thus constructed, the moving part 4 is assembled by first winding the coils 10 around the individual magnetic teeth 8, 9. Next, the dovetail grooves 8a formed in the individual magnetic teeth 8 are fitted over the respective connecting parts 7 held by the bolts 6 fitted in the moving yoke 5 by sliding the magnetic teeth 8 in a direction perpendicular to the plane of the paper (FIG. 20) and, when the magnetic teeth 8 have been set into position, they are fixed to the moving yoke 5 by tightening the bolts 6. Then, the individual magnetic teeth 9 are slid between the successive magnetic teeth 8 with the recess 9a and the protrusion 9b formed on each magnetic tooth 9 meshed with the protrusion 8c and the recess 8b of the adjoining magnetic teeth 8, respectively. Finally, the alternately arranged magnetic teeth 8, 9 and the coils 10 are joined together into a single structure by the resin molding 11.

Since the conventional linear motor is assembled by inserting the magnetic teeth 9 between the successive magnetic teeth 8 as stated above, the coils 10 wound around the magnetic teeth 9 slide over the coils 10 wound around the magnetic teeth 8 with friction. This assembly process could cause damages to the coils 10, such as an insulation failure or a wire breakage, resulting in a reduction in reliability.

Furthermore, the conventional linear motor is associated with a poor labor efficiency problem. This is because its assembly involves rather complicated procedures including fitting and sliding the dovetail grooves 8a formed in the individual magnetic teeth 8 over the respective connecting parts 7, tightening the bolts 6 to fix the magnetic teeth 8 to the moving yoke 5, mating the recess 9a and the protrusion 9b formed on each magnetic tooth 9 with the protrusion 8c and the recess 8b of the adjoining magnetic teeth 8 and sliding them to fit the magnetic teeth 9 between the successive magnetic teeth 8.

Generally, magnetic teeth are manufactured by stacking press-cut electromagnetic steel sheets. Accordingly, the stacking thickness of the electromagnetic steel sheets should be increased if it is necessary to increase the width of the individual magnetic teeth due to an increase in motor capacity. An increase in the stacking thickness tends to cause an inclination of the stacked electromagnetic steel sheets due to stacking errors as well as a deterioration in assembling efficiency. In addition, it is necessary to increase the thickness of a lower press die if the stacking thickness increases. This would lead to an increase in cost for making the die and an eventual rise in manufacturing cost of the magnetic teeth.

Even when the structure of magnetic teeth does not adopt the aforementioned steel sheet stacking design, it is still necessary to vary the width of the individual magnetic teeth with changes in motor capacity, and this makes it difficult to attain desirable levels of efficiency with respect to the control of production and inventory of various components.

SUMMARY OF THE INVENTION

In light of the aforementioned problems of the prior art, it is an object of the invention to provide a novel structure for joining a plurality of magnetic teeth into a single structure. More specifically, it is an object of the invention to provide a linear motor adopting a magnetic tooth joining structure which permits improvements in reliability of a magnetic tooth assembly and in assembling efficiency. It is also an object of the invention to enable a cost reduction by improving the efficiency of controlling the production and inventory of components regardless of changes in motor capacity.

According to a principal feature of the invention, a linear motor comprises a stator including a stator yoke extending in a motor running direction and a plurality of permanent magnets arranged on the stator yoke at regular intervals along the motor running direction in alternately reversed directions to produce alternating polarities, and a moving part positioned generally parallel to the permanent magnets of the stator and separated therefrom by a specific gap, the moving part including a plurality of magnetic teeth arranged side by side along the motor running direction and coils wound around the individual magnetic teeth. In this linear motor, each of the magnetic teeth has a yoke portion located opposite to a side facing the stator, the yoke portion of each magnetic tooth being held in contact with the yoke portion of each adjoining magnetic tooth, and a tooth portion around which the coil is wound, the tooth portion extending from the yoke portion toward the stator. Cutouts formed in end surfaces of the yoke portions of the individual magnetic teeth opposite to their side facing the stator line up to form a groove-shaped channel running through the yoke portions of the successive magnetic teeth, and the multiple magnetic teeth are joined together into a single structure by fitting a connecting member in the groove-shaped channel.

The linear motor thus constructed offers enhanced reliability and greater assembling efficiency.

These and other objects, features and advantages of the invention will become more apparent upon reading the following detailed description along with the accompanying drawings.

BRIEF DESCRIPTION OF THE DRAWINGS

FIGS. 1A–1B are diagrams showing the construction of a linear motor according to a first embodiment of the invention, in which FIG. 1A is a plan view and FIG. 1B is a cross-sectional side view;

DESCRIPTION OF THE PREFERRED EMBODIMENTS

Preferred embodiments of the invention are now described with reference to the appended drawings.

First Embodiment

Figure 1A:
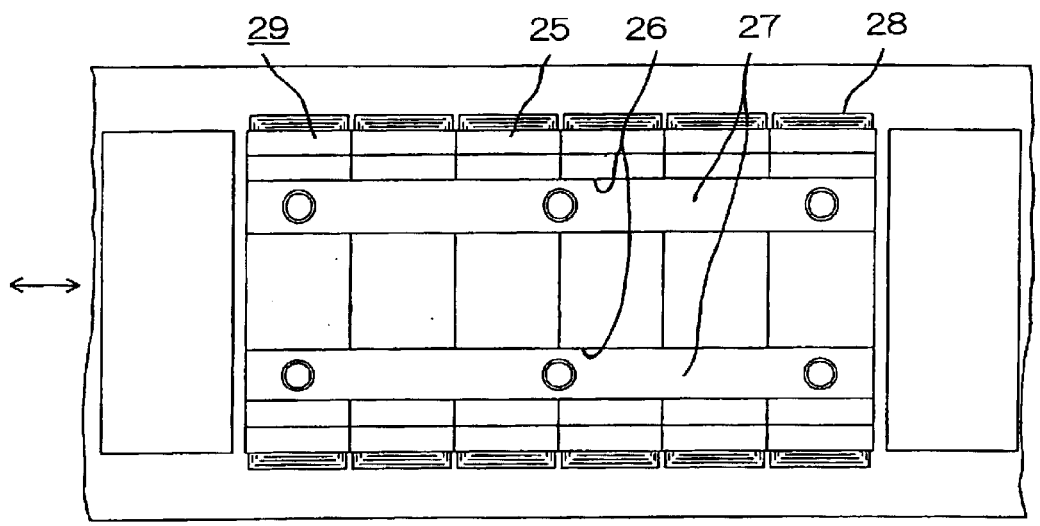
Figure 1B:
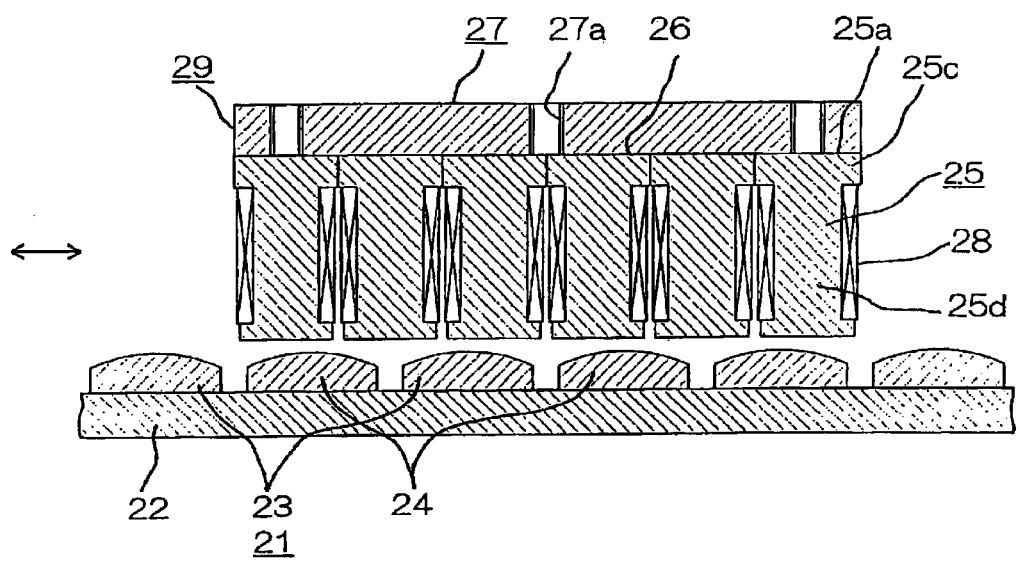
Figure 2:
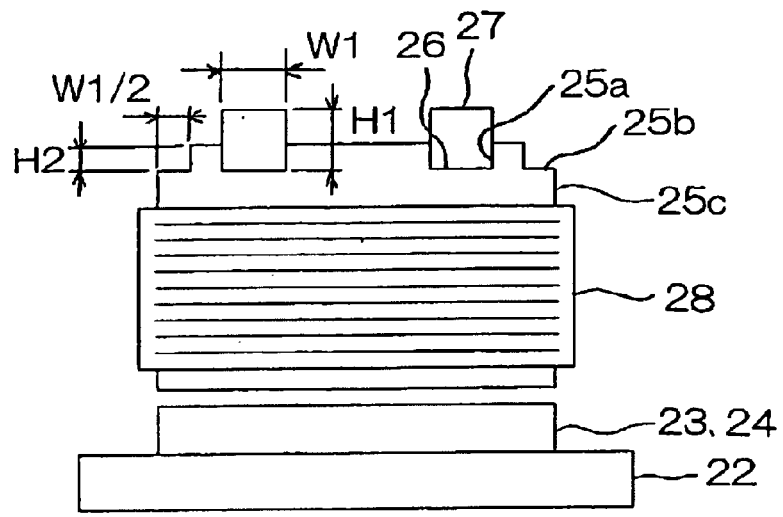
FIG. 2 is a front view of the linear motor of FIGS. 1A–1B.
Figure 3:
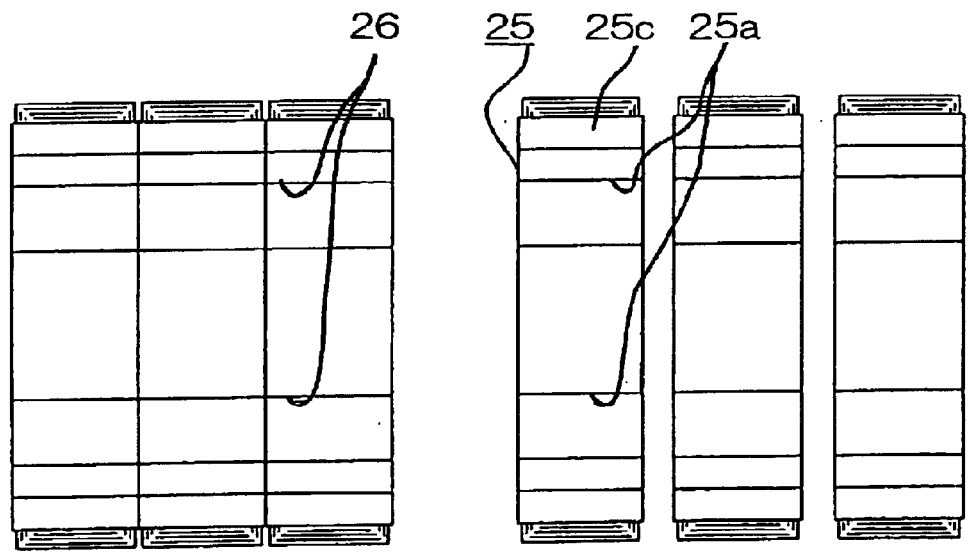
FIG. 3 is a plan view showing how magnetic teeth of the linear motor are successively arranged.
Figure 4:
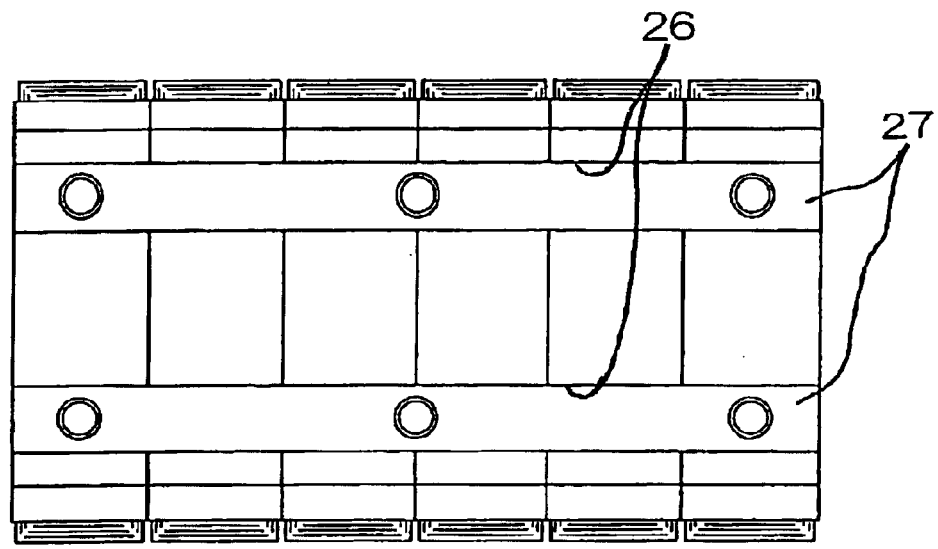
FIG. 4 is a front view showing how the magnetic teeth are joined into a single structure by means of connecting bars.
Figure 5:
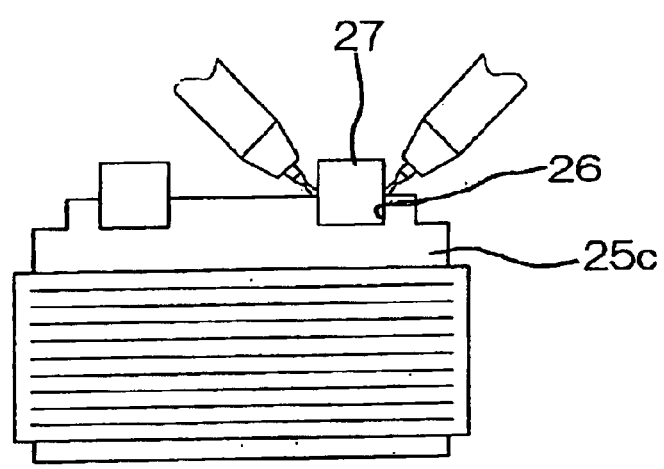
FIG. 5 is a front view showing how the connecting bars are welded to the magnetic teeth.
Figure 6:
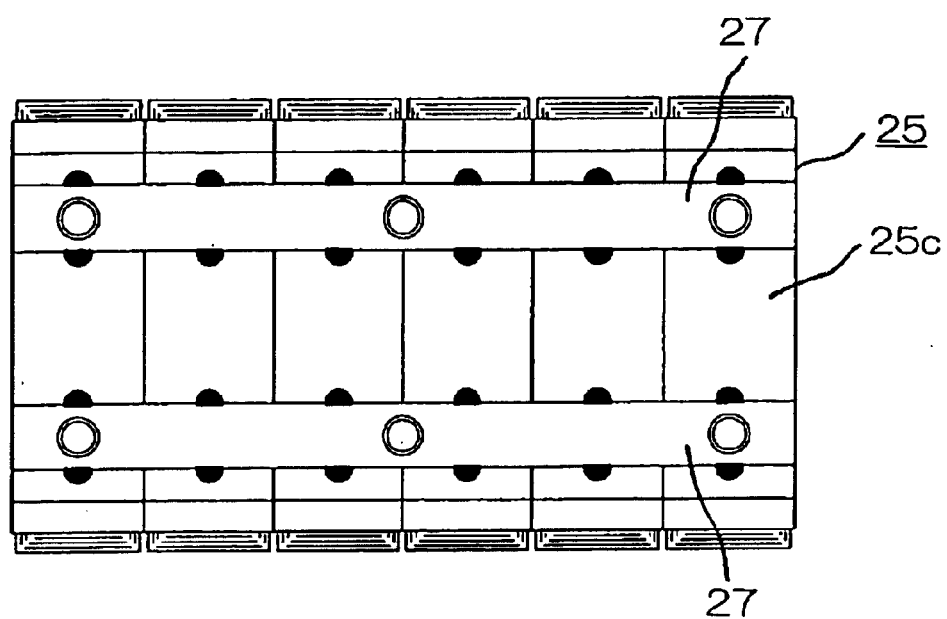
FIG. 6 is a plan view showing an assembly of the magnetic teeth upon completion of a welding process shown in FIG. 5.
Figure 7:
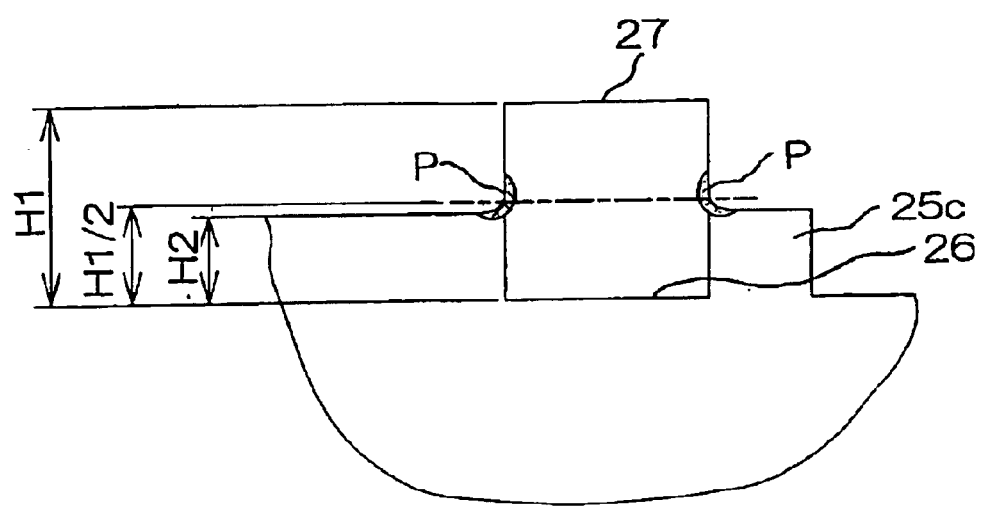
FIG. 7 is a diagram showing details of how each connecting bar is welded to the magnetic teeth.

FIGS. 1A–1B are diagrams showing the construction of a linear motor according to a first embodiment of the invention, in which FIG. 1A is a plan view and FIG. 1B is a cross-sectional side view. FIG. 2 is a front view of the linear motor of FIGS. 1A–1B, FIG. 3 is a plan view showing how magnetic teeth 25 of the linear motor are successively arranged, FIG. 4 is a front view showing how the magnetic teeth 25 are joined into a single structure by means of connecting bars 27, FIG. 5 is a front view showing how the connecting bars 27 are welded to the magnetic teeth 25, FIG. 6 is a plan view showing an assembly of the magnetic teeth 25 upon completion of a welding process shown in FIG. 5, and FIG. 7 is a diagram showing details of how each connecting bar 27 is welded to the magnetic teeth 25.

Referring to these Figures, a stator 21 includes a platelike stator yoke 22 extending in a motor running direction shown by double arrows (FIGS. 1A–1B) and a plurality of permanent magnets 23, 24 arranged on the stator yoke 22 at regular intervals along the motor running direction in alternately reversed directions to produce alternating polarities. Separated by a specific distance from the permanent magnets 23, 24 arranged on the stator yoke 22, a moving part 29 includes the aforementioned multiple magnetic teeth 25 arranged along the motor running direction, coils 28 individually wound around the magnetic teeth 25 and the aforementioned connecting bars 27 joining together the magnetic teeth 25 into a single structure.

As illustrated in FIG. 1B, upper parts of the individual magnetic teeth 25 (that are opposite to ends of the magnetic teeth 25 facing the stator 21) constitute yoke portions 25c, from which tooth portions 25d extend downward toward the stator 21. The coils 28 are wound around the individual tooth portions 25d and the multiple magnetic teeth 25 are arranged side by side with side faces of their yoke portions 25c held in contact with one another.

Referring now to FIG. 2, a pair of cutouts 25a (width W1, depth H2) having a rectangular cross section are formed at specific locations in an upper end surface of the yoke portion 25c of each magnetic tooth 25 in such a manner that the cutouts 25a in the successive yoke portions 25c line up along the motor running direction (which is perpendicular to the plane of the paper in FIG. 2). At both upper corners (left and right as illustrated in FIG. 2) of the yoke portion 25c of each magnetic tooth 25, there are formed cutouts 25b each having a width equal to one half the width W1 of each cutout 25a (i.e., W1/2). When the magnetic teeth 25 are assembled, the cutouts 25a formed in the individual yoke portions 25c line up in double straight lines and together form a pair of groove-shaped channels 26 running through the successive magnetic teeth 25 (refer to FIGS. 1A–1B).

The aforementioned connecting bars 27 are fitted in the individual groove-shaped channels 26 all the way along their length to join together the magnetic teeth 25. There are formed screw holes 27a in the connecting bars 27 at specific positions for fixing them to an unillustrated driven part.

Assembly processes of the moving part 29 of the linear motor of the first embodiment thus constructed are specifically described below referring to the drawings.

First, the coils 28 are wound around the individual magnetic teeth 25. The individual magnetic teeth 25 are then aligned with the side faces of the yoke portions 25c placed in contact with one another as shown in FIG. 3. As a result, the cutouts 25a in the individual yoke portions 25c line up in double straight lines, together forming the two groove-shaped channels 26. Then, the connecting bars 27 are fitted in the groove-shaped channels 26 as shown in FIG. 4 and welded as shown in FIG. 5, so that the connecting bars 27 are firmly fixed to the yoke portions 25c of the individual magnetic teeth 25 as shown in FIG. 6. The magnetic teeth 25 are joined together by the connecting bars 27 into a single structure, whereby assembly of the moving part 29 is completed.

The aforementioned welding process is explained in further detail referring to FIG. 7. What is important in this welding process is the relationship between the height H1 of the connecting bars 27 and the depth H2 of the groove-shaped channels 26 (cutouts 25a) as can be recognized from FIG. 7. If either of the connecting bars 27 warps due to thermal shrinkage occurring at welding points P, there arises a problem that an array of the magnetic teeth 25 joined by the connecting bars 27, particularly a bottom surface of the moving part 29 facing the stator 21, would become deformed.

It is therefore desirable that the depth H2 of the groove-shaped channels 26 be made slightly smaller than half the height H1 of the connecting bars 27 (i.e., H1/2) so that the welding points P are located generally at the middle of the height H1 of the connecting bars 27.

It will be recognized that if there is established a relationship H2<H1/2, the welding points P might be located slightly below the middle of the height H1 of the connecting bars 27 depending on performance of welding operation. In this case, the connecting bars 27 tend to warp, swelling upward at central parts, as a result of the welding operation. Even if this situation occurs, however, deformation of the bottom surface of the moving part 29 facing the stator 21 is made sufficiently small as compared to a case where the welding points P are located above the middle of the height H1 of the connecting bars 27. This is because side surfaces of the successive magnetic teeth 25 joined by the connecting bars 27 are in direct contact with one another in the above-described structure of the first embodiment.

As can be seen from the foregoing discussion, the cutouts 25a formed in the upper end surfaces of the yoke portions 25c of the individual magnetic teeth 25 line up in double straight lines, together forming the two groove-shaped channels 26, and the connecting bars 27 are fitted into these groove-shaped channels 26 to join together the magnetic teeth 25 into a single structure in the aforementioned first embodiment. This structure of the embodiment facilitates assembly of the moving part 29 and helps improve assembling efficiency. In addition, the individual magnetic teeth 25 can be assembled without causing the adjacent coils 28 to slide over each other with friction, and this serves to prevent insulation failures and wire breakage and improve reliability.

Furthermore, it is possible to prevent warpage of the connecting bars 27 or reduce the influence of their warpage by making the depth H2 of the groove-shaped channels 26 smaller than half the height H1 of the connecting bars 27 (H2<H1/2) when fixing the connecting bars 27 into the groove-shaped channels 26 by welding. This makes it unnecessary to carry out operation for removing the effect of warpage of the connecting bars 27 and thereby improve assembling efficiency.

Second Embodiment

Figure 8:
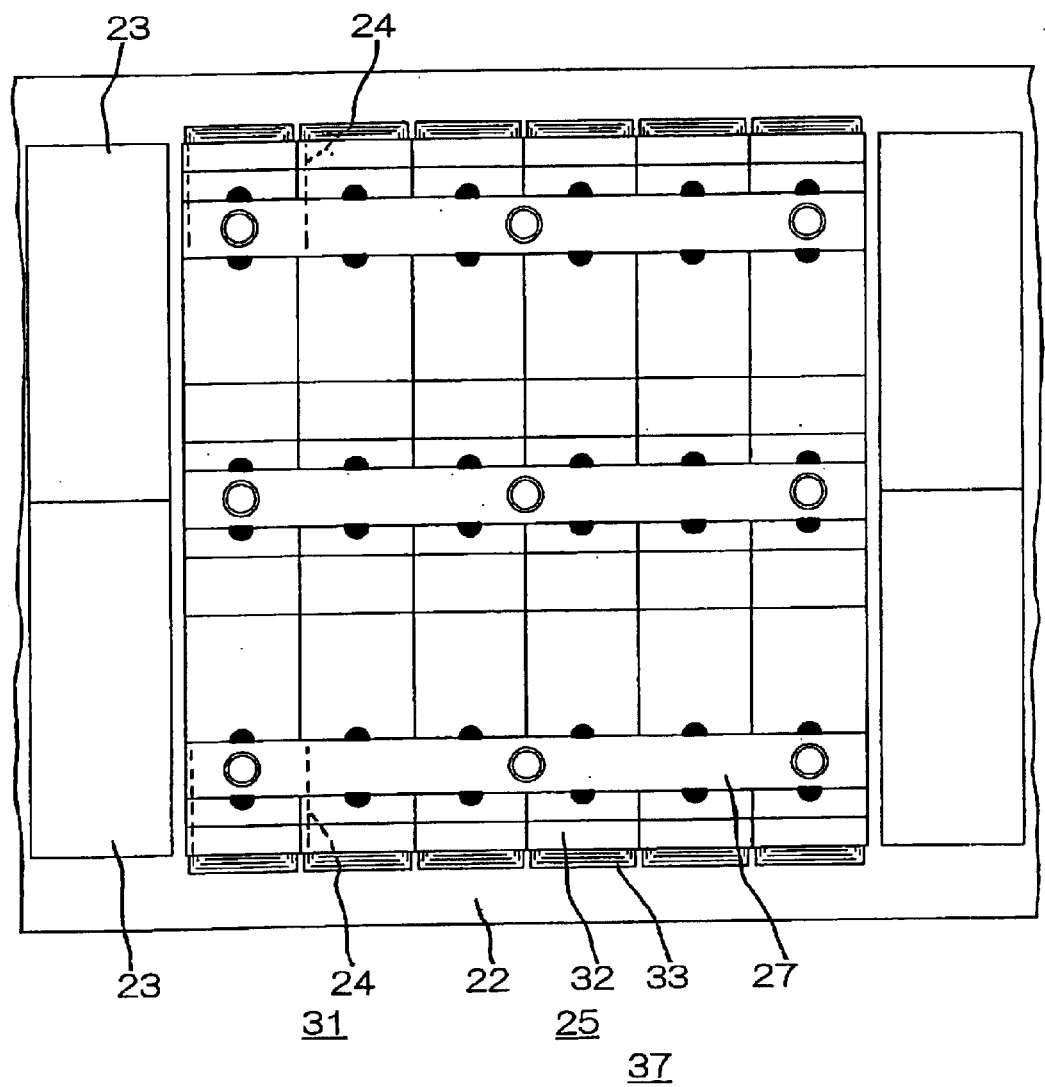
FIG. 8 is a plan view showing the construction of a linear motor according to a second embodiment of the invention.
Figure 9:
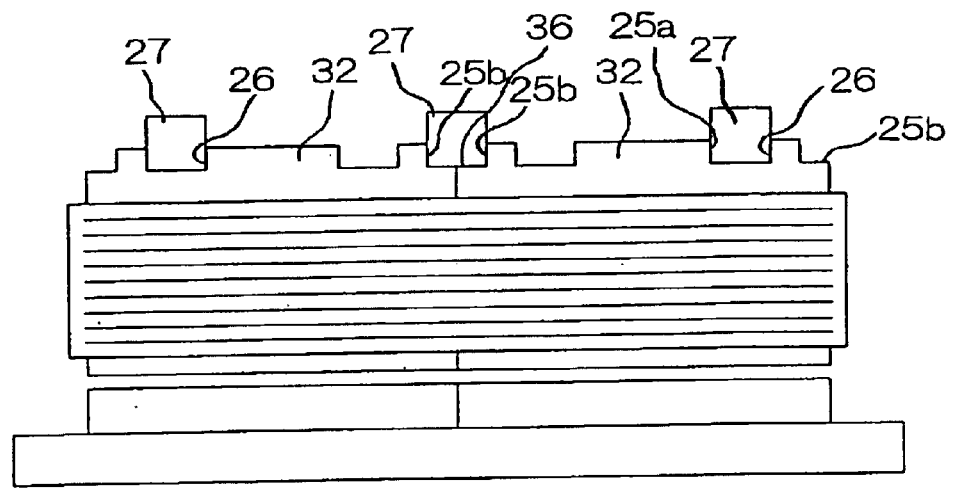
FIG. 9 is a front view of the linear motor of FIG. 8.
Figure 10:
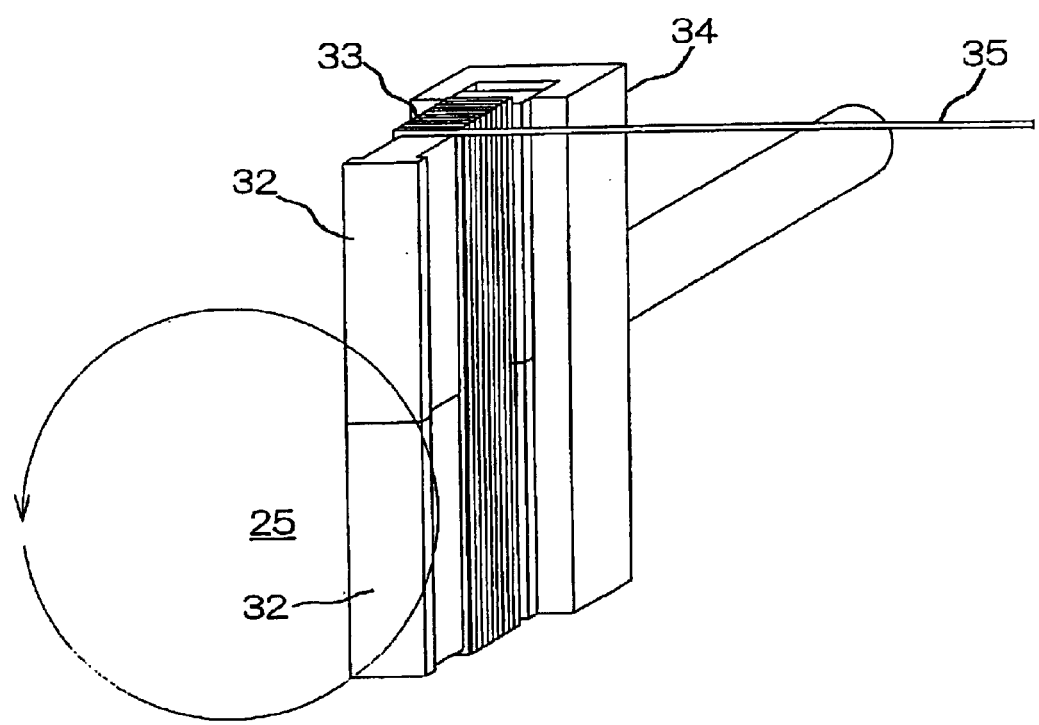
FIG. 10 is a perspective view showing a process of winding a coil around one of magnetic teeth shown in FIG. 8.

FIG. 8 is a plan view showing the construction of a linear motor according to a second embodiment of the invention, FIG. 9 is a front view of the linear motor of FIG. 8, and FIG. 10 is a perspective view showing a process of winding a coil 33 around one of magnetic teeth 25 shown in FIG. 8. In these Figures, elements identical to those of the foregoing first embodiment are designated by the same reference numerals and a description of such elements is omitted.

Referring to the Figures, a stator 31 includes a stator yoke 22 and permanent magnets 23 and 24 alternately arranged in a double row on the stator yoke 22. Each of the magnetic teeth 25 constituting a moving part 37 is formed of a pair of magnetic tooth elements 32 aligned in a direction perpendicular to a motor running direction. As depicted in FIG. 10, each pair of magnetic tooth elements 32 is held by a wire-winding jig 34 and turned in a direction shown by an arrow, whereby the two magnetic tooth elements 32 are securely joined together by the coil 33 form by a magnet wire 35 wound around them.

In this embodiment, a plurality of magnetic teeth 25 individually would by the coils 33 as described above are arranged side by side with side faces of their yoke portions 25c held in contact with one another in the same manner as in the first embodiment. When the magnetic teeth 25 are arranged in this fashion, cutouts 25a formed in the individual magnetic teeth 25 line up and together form four parallel groove-shaped channels 26 in a top surface of the moving part 37, and cutouts 25b formed at both upper corners of the individual magnetic tooth elements 32 also line up and together form a groove-shaped channel 36 bridging the inside upper corners of the double rows of the magnetic tooth elements 32. Three connecting bars 27 are then fitted in the individual groove-shaped channels 26, 36 as shown in FIG. 9 and fixed therein by welding them at specific points as shown in FIG. 8. Consequently, the individual magnetic teeth 25 are securely joined together by the connecting bars 27 into a single structure, whereby assembly of the moving part 37 is completed.

As seen above, each magnetic tooth 25 is formed by winding the coil 33 around a pair of magnetic tooth elements 32 arranged in tandem in a direction perpendicular to the motor running direction in the aforementioned second embodiment. This structure of the embodiment makes it possible to flexibly increase (or decrease) in accordance with changes in required power of the linear motor (motor capacity) by a combination of the magnetic tooth elements 32. The embodiment not only serves to improve assembling efficiency but enables the use of the same components for different purposes, facilitates the control of inventory of various components and helps achieve an eventual cost reduction.

Particularly when the magnetic teeth are formed by stacking electromagnetic steel sheets, they can be produced by combining the magnetic tooth elements 32 having a standardized shape and dimensions. Consequently, even when the required motor capacity increases, the stacking thickness of the electromagnetic steel sheets can be held within specific limits. This serves to reduce the cost of a press die, decrease an inclination of the stacked electromagnetic steel sheets due to stacking errors and improve productivity. If multiple magnetic tooth elements 32 are stacked while reversing their directions as necessary, it would be possible to further decrease the inclination of the entire assembly of the magnetic teeth 25.

Furthermore, since the groove-shaped channel 36 formed in the top surface of the moving part 37 bridges the double rows of the magnetic tooth elements 32 and the connecting bar 27 is fitted in the groove-shaped channel 36, the magnetic tooth elements 32 are joined even more securely, this serves to further improve the reliability.

While the magnetic tooth 25 of the second embodiment is formed by arranging two magnetic tooth elements 32 in tandem in a direction perpendicular to the motor running direction and uniting them by winding the coil 33, the number of magnetic tooth elements 32 to be united into a single structure is not necessarily limited to two, but three or more magnetic tooth elements 32 may be jointed together to form a larger magnetic tooth.

The aforementioned method of forming a magnetic tooth by arranging multiple magnetic tooth elements in tandem in a direction perpendicular to the motor running direction and uniting them into a single structure by a coil wound around them is not necessarily limited to the linear motor described above employing a structure in which the a plurality of magnetic teeth 25 are joined together by the connecting bars 27. The novel method of the present embodiment can also be applied to other structures of linear motors, such as the earlier-mentioned conventional linear motor in which the moving yoke 5 and the magnetic teeth 8, 9 are separately produced and joined together by a dovetail joint structure, facilitating the control of inventory of components and enabling a cost reduction. In a case where the magnetic teeth are formed by stacking electromagnetic steel sheets, the aforementioned method of the present embodiment serves to reduce the inclination of the stacked electromagnetic steel sheets due to stacking errors, improve productivity and reduce the cost of the press die.

Third Embodiment

Figure 11:
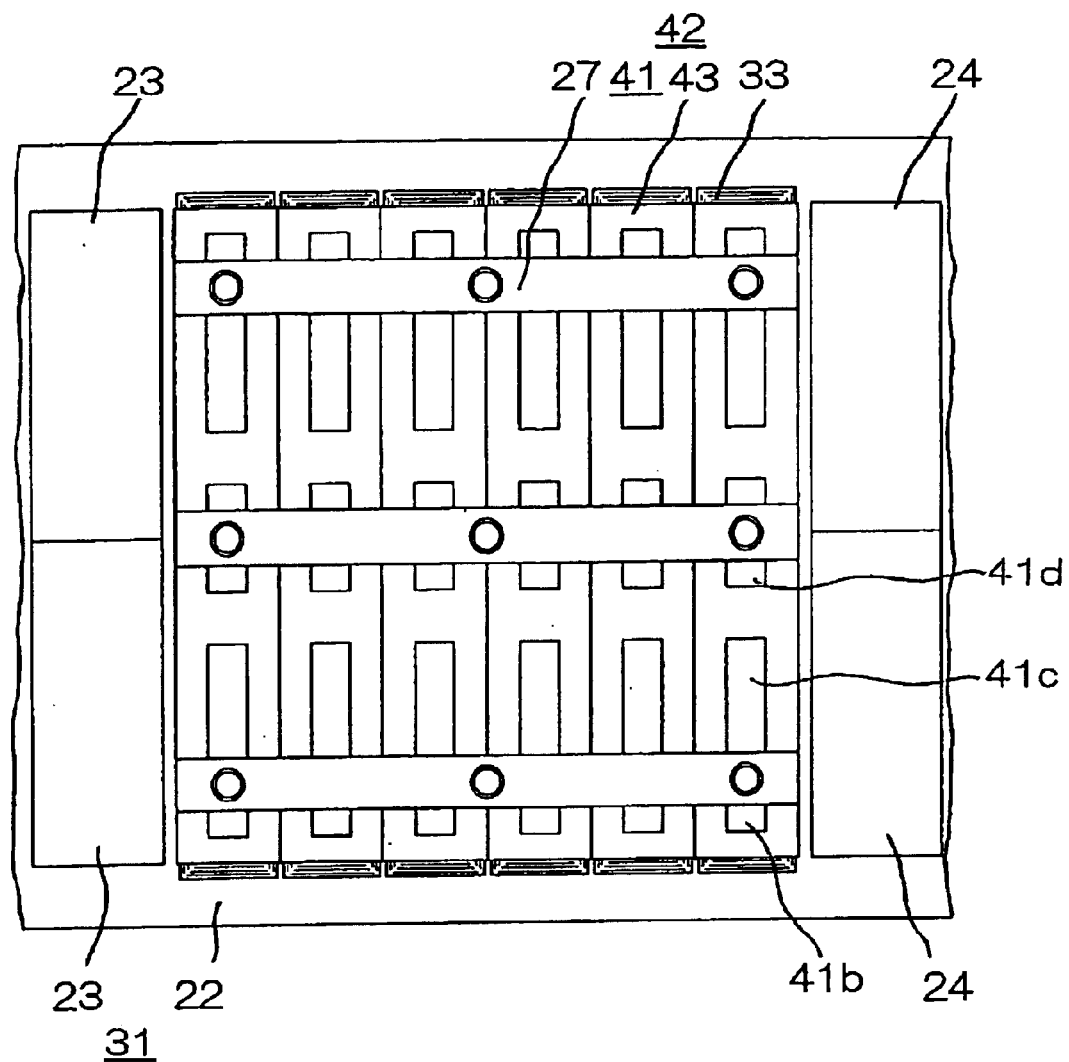
FIG. 11 is a plan view showing the construction of a linear motor according to a third embodiment of the invention.
Figure 12:
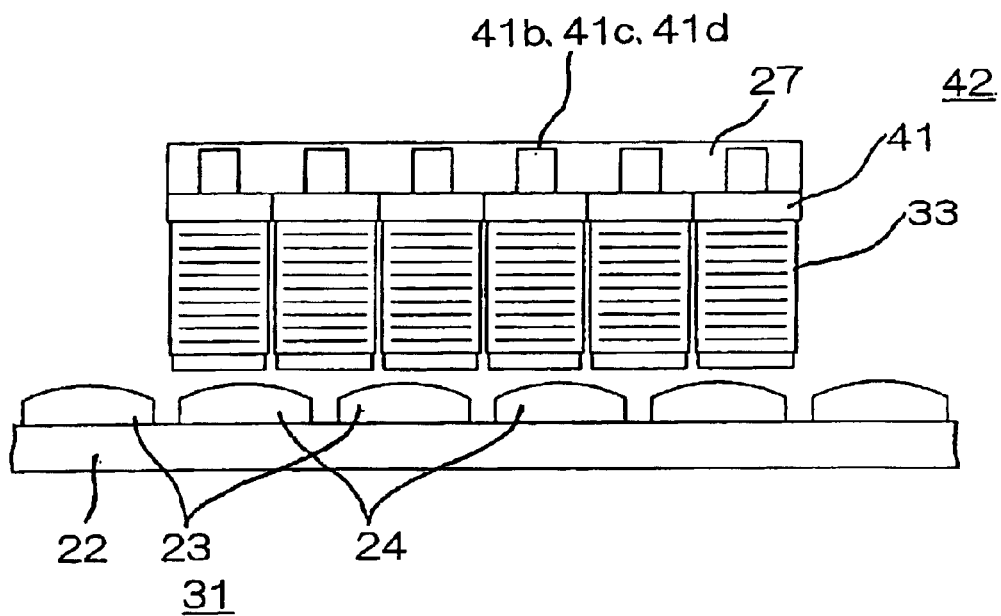
FIG. 12 is a side view of the linear motor of FIG. 11.
Figure 13:
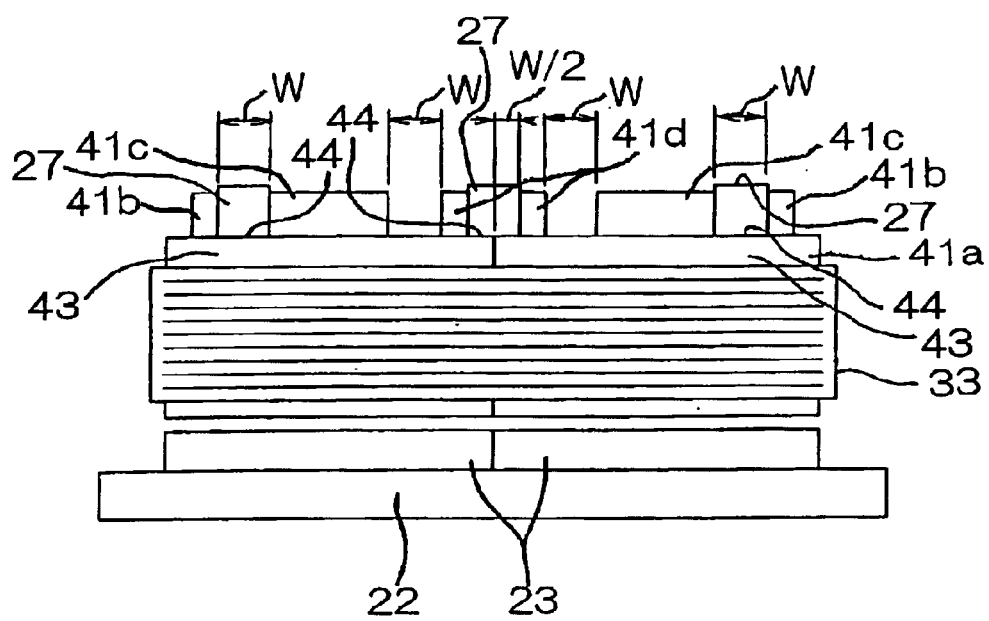
FIG. 13 is a front view of the linear motor of FIG. 11.
Figure 14A:
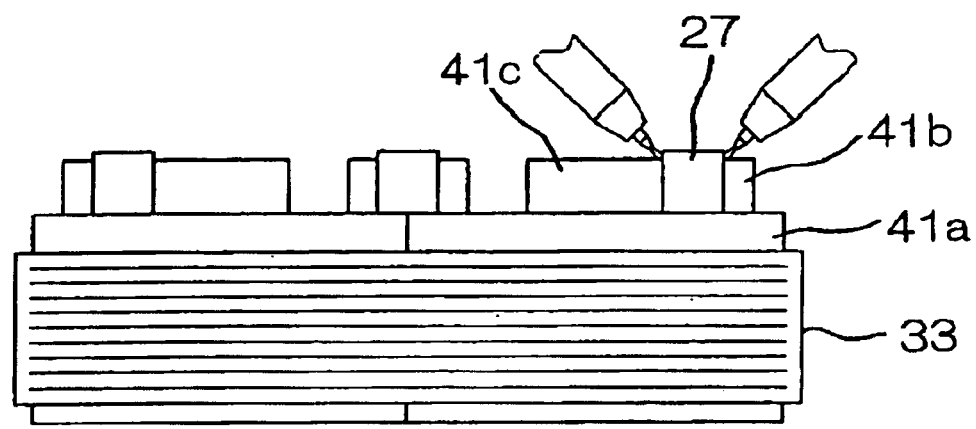
FIGS. 14A–14B are front views showing how connecting bars are welded to individual magnetic teeth shown in FIG. 11.
Figure 14B:
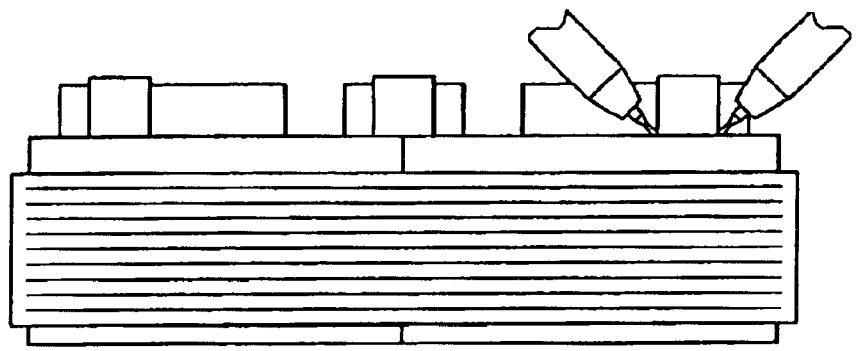
Figure 15:
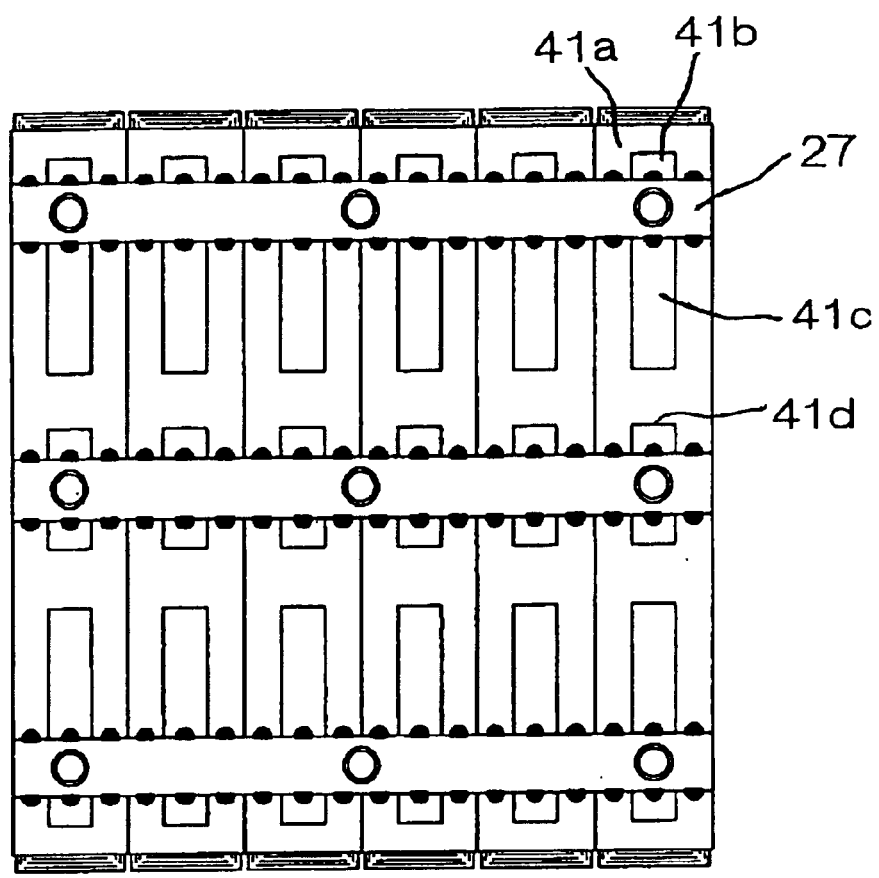
FIG. 15 is a plan view showing an assembly of the magnetic teeth upon completion of a welding process shown in FIG. 14.

FIG. 11 is a plan view showing the construction of a linear motor according to a third embodiment of the invention, FIG. 12 is a side view of the linear motor of FIG. 11, FIG. 13 is a front view of the linear motor of FIG. 11, FIGS. 14A–14B are front views showing how connecting bars 27 are welded to individual magnetic teeth 41 shown in FIG. 11, and FIG. 15 is a plan view showing an assembly of the magnetic teeth 41 upon completion of a welding process shown in FIG. 14. In these Figures, elements identical to those of the foregoing second embodiment are designated by the same reference numerals and a description of such elements is omitted.

Referring to the Figures, each of the magnetic teeth 41 constituting a moving part 42 is formed of a pair of magnetic tooth elements 43 aligned in a direction perpendicular to a motor running direction. As described with reference to the aforementioned second embodiment, two magnetic tooth elements 43 are fastened and joined together into a single structure by a coil 33 wound around them. As shown in FIG. 13, two projecting parts 41b, 41c are formed on an upper end surface of a yoke portion 41a of each magnetic tooth element 43, the two projecting parts 41b, 41c being separated by a distance W which is equal to the width of each connecting bar 27. There is formed another projecting part 41d on the upper end surface of the yoke portion 41a of each magnetic tooth element 43. This projecting part 41d is located such that when two magnetic tooth elements 43 are aligned to form one magnetic tooth 41, the projecting parts 41d of the magnetic tooth elements 43 face each other with their facing side surfaces positioned half the width W of the connecting bar 27 (W/2) apart from a side face of each yoke portion 41a, creating an interval W between the facing side surfaces of the two projecting parts 41d. Opposite side surfaces of the projecting parts 41d are separated from the projecting parts 41c of the respective magnetic tooth elements 43 by a distance equal to W.

Assembly processes of the moving part 42 of the linear motor of the third embodiment thus constructed are specifically described below referring to the drawings.

A pair of magnetic tooth elements 43 are arranged in tandem with their sides held in contact with each other in such a manner that the projecting parts 41d formed on their yoke portions 41a face each other and, then, the coil 33 is wound around the two magnetic tooth elements 43 to securely join them into a single structure, thereby forming each magnetic tooth 41. The individual magnetic teeth 41 thus formed are arranged side by side along the motor running direction with the side faces of their yoke portions 41a held in contact with one another. When the magnetic teeth 41 are arranged in this fashion, there are formed parallel groovelike channels 44 due to the intervals W between the projecting parts 41b and 41c. There is also formed another groovelike channel 44 between the projecting parts 41d formed close to inner ends of the magnetic teeth 41. Then, three connecting bars 27 are fitted in the groovelike channels 44 formed between the projecting parts 41b and 41c and between the projecting parts 41d as shown in FIG. 13. The connecting bars 27 are welded to the respective groovelike channels 44 as shown in FIGS. 14A–14B, whereby upper parts of side surfaces of the connecting bars 27 are fixed to upper edges of the individual projecting parts 41b, 41c, 41d and lower parts of the side surfaces of the connecting bars 27 are fixed to upper ends of the yoke portions 41a. As a result of this welding operation, the individual magnetic teeth 41 aligned as described above are securely joined together by the connecting bars 27 into a single structure, whereby assembly of the moving part 42 is completed.

As depicted in the foregoing discussion, the magnetic teeth 41 are joined into a single structure by fitting and fixing the connecting bars 27 between the projecting parts 41b and 41c formed on the upper end surfaces of the yoke portions 41a of the individual magnetic teeth 41 and between the facing projecting parts 41d in the third embodiment. This structure makes it possible to assemble the moving part 42 with least effort and thereby improve assembling efficiency. In addition, the magnetic teeth 41 can be assembled without causing the adjacent coils 33 to slide over each other with friction, and this serves to prevent insulation failures and wire breakage and improve reliability.

The connecting bar 27 in the middle bridges the two magnetic tooth elements 43 of each magnetic tooth 41 when fitted in the groovelike channel 44 formed between the facing projecting parts 41d of the individual magnetic tooth elements 43. This serves to reinforce the one-piece assembly of the magnetic teeth 41, resulting in a further improvement of reliability. Furthermore, because the individual connecting bars 27 are fitted in the groovelike channels 44 formed between the projecting parts 41b and 41c and between the projecting parts 41d, their welding operation is quite easy, and this also serves to improve the assembling efficiency. Moreover, their welding points have an increased capability to withstand a moment of force applied thereupon as both upper and lower parts of the side surfaces of the connecting bars 27 are welded to the magnetic tooth elements 43, resulting in an even further improvement in reliability.

As is apparent from FIG. 13, there is formed a gap as wide as W between the projecting parts 41c and 41d of each magnetic tooth element 43. Although three connecting bars 27 are fitted in the groovelike channels 44 formed between the projecting parts 41b and 41c and between the projecting parts 41d in the third embodiment described heretofore, additional connecting bars 27 may be fitted in groovelike channels formed between the projecting parts 41c and 41d when needed to further reinforce the one-piece assembly of the magnetic teeth 41.

While the magnetic tooth 41 is formed by arranging two magnetic tooth elements 43 in tandem in the aforementioned third embodiment, it is needless to say that the same advantageous effect as described above can be achieved by fitting the connecting bars 27 in the groovelike channels 44 formed between the projecting parts 41b and 41c and/or between the projecting parts 41c and 41d even when the assembly of the magnetic teeth is formed by a single row or more than two rows of the magnetic tooth elements 43.

Fourth Embodiment

Figure 16:
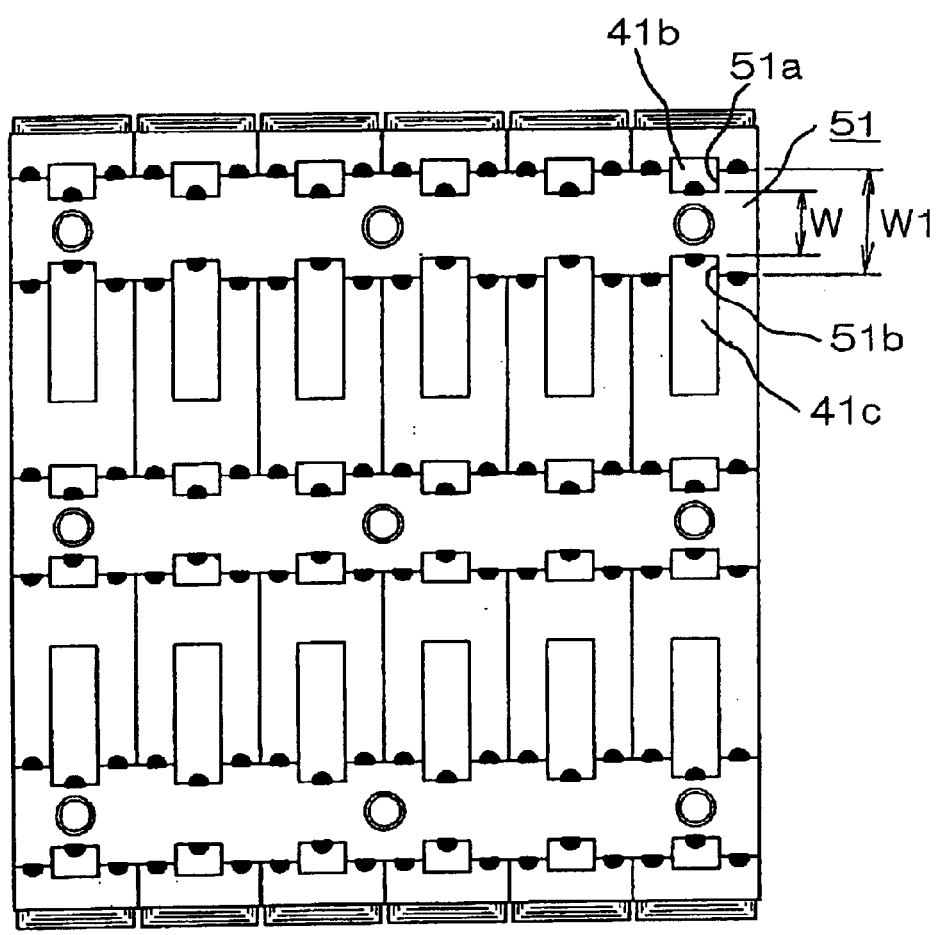
FIG. 16 is a plan view showing the construction of a linear motor according to a fourth embodiment of the invention.

FIG. 16 is a plan view showing the construction of a linear motor according to a fourth embodiment of the invention, in which elements identical to those of the foregoing third embodiment are designated by the same reference numerals and a description of such elements is omitted.

In this embodiment, each connecting bar 51 has a width W1 larger than the distance W between projecting parts 41b and 41c, and there are formed recesses 51a and 51b in both side surfaces of each connecting bar 51 in which the projecting parts 41b and 41c fit, respectively.

Since the width W1 of each connecting bar 51 is made larger than the distance W between the projecting parts 41b and 41c and the recesses 51a and 51b in which the projecting parts 41b and 41c fit are formed in both side surfaces of each connecting bar 51 in this fourth embodiment, movements of the connecting bars 51 in their longitudinal direction are restricted when the projecting parts 41b and 41c are fitted in the recesses 51a and 51b, respectively. This structure makes it possible to attach the connecting bars 51 in position more securely and further improve reliability.

Fifth Embodiment

A fifth embodiment of the invention provides an optimum construction of connecting bars applicable when individual magnetic teeth are formed by stacking electromagnetic steel sheets in a direction perpendicular to a motor running direction.

Figure 17:
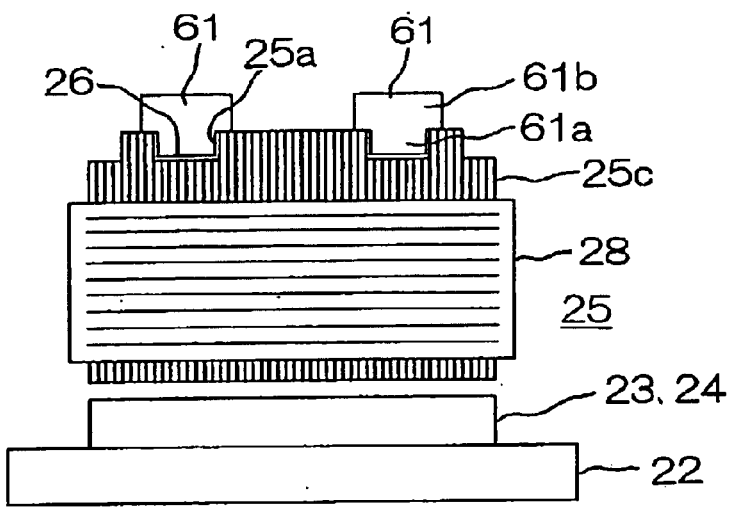
FIG. 17 is a front view showing the construction of a linear motor according to a fifth embodiment of the invention.

Although the connecting bars 27 (51) of the foregoing embodiments have a rectangular cross section, connecting bars 61 of the fifth embodiment each have a downward-directed ridgelike projection as shown in FIG. 17.

In this embodiment, the direction of the width of each groove-shaped channel 26 formed by cutouts 25a in yoke portions 25c of individual magnetic teeth 25 matches the stacking direction of the electromagnetic steel sheets and, therefore, the width of each groove-shaped channel 26 could vary due to variations in the thickness of the individual electromagnetic steel sheets and fastening force of coils 28 wound around the magnetic teeth 25. For this reason, there is a possibility that gaps will occur between the connecting bar 61 and the groove-shaped channel 26, making it impossible to obtain a stable welding effect.

To cope with this problem, each connecting bar 61 has a downward-projecting mating part 61a (i.e., the aforementioned ridgelike projection) which fits in the groove-shaped channel 26 with specific gaps between them and a flange portion 61b which comes in contact with a top surface of the yoke portions 25c of the magnetic teeth 25 along the groove-shaped channel 26.

Figure 18:
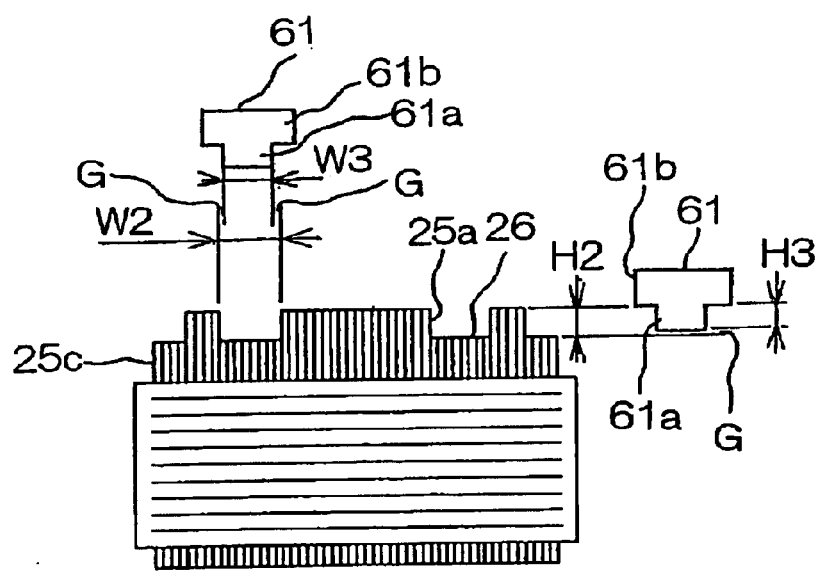
FIG. 18 is a diagram showing the relationship between the dimensions of connecting bars and groove-shaped channels.

As shown in FIG. 18, width W3 of the mating part 61a is made smaller than width W2 of the groove-shaped channel 26. Given this relationship, W2>W3, gaps G are created between the mating part 61a and the groove-shaped channel 26 as illustrated even when certain amounts of variations occur in the width W2 of the groove-shaped channel 26. In addition, the height H3 of the mating part 61a is made smaller than the depth H2 of the groove-shaped channel 26 so that a gap G is created between the bottom of the mating part 61a and the bottom of the groove-shaped channel 26.

Figure 19:
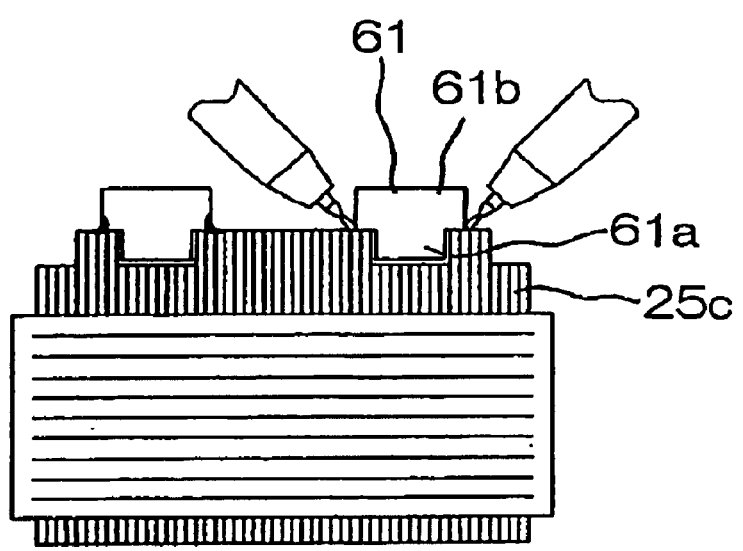
FIG. 19 is a front view showing how the connecting bars are welded to magnetic teeth.
Figure 20:
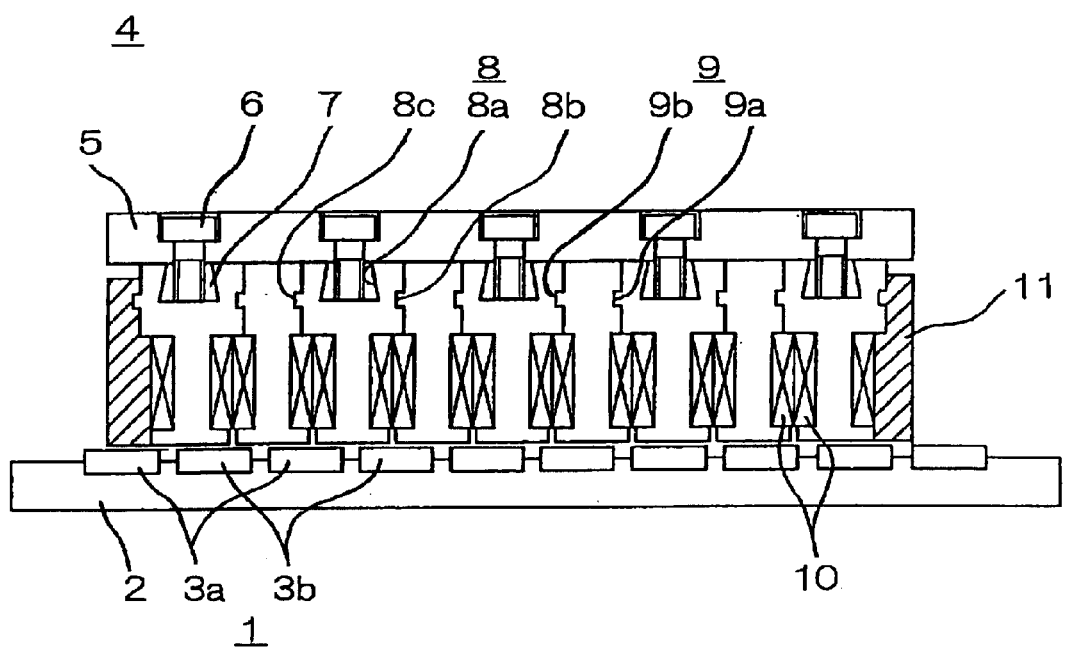
FIG. 20 is a cross-sectional diagram showing the construction of a conventional linear motor.

In the aforementioned structure, a bottom surface of the flange portion 61b of each connecting bar 61 comes in close contact with the top surface of the yoke portions 25c of the magnetic teeth 25 along each connecting bar 61 in a reliable fashion even when certain amounts of variations occur in the width W2 of the groove-shaped channels 26. This construction makes it possible to weld each connecting bar 61 to the corresponding groove-shaped channel 26 along their contact areas, enabling easy and stable welding operation as shown in FIG. 19. As a result, the multiple magnetic teeth 25 can be reliably joined together into a single structure by the connecting bars 61.

While the connecting bars 61 are fitted into the groove-shaped channels 26 formed by cutouts 25a made in the yoke portions 25c of the individual magnetic teeth 25 in the fifth embodiment, the aforementioned structure of the embodiment is also applicable to the structure of the earlier-mentioned third embodiment in which the connecting bars 27 are fitted in the groovelike channels 44 formed between the adjacent projecting parts 41b, 41c, 41d, producing the same advantageous effect as described above.

Although not stated in the foregoing description of the individual embodiments, it is possible to enlarge magnetic paths and improve overall performance of the linear motor by forming the connecting bars 27, 51, 61 with magnetic material.

What is claimed is:

1. A linear motor comprising:

a stator including a stator yoke extending in a motor running direction and a plurality of permanent magnets arranged on the stator yoke at regular intervals along the motor running direction in alternately reversed directions to produce alternating polarities; and a moving part positioned generally parallel to the permanent magnets of the stator and separated therefrom by a specific gap, the moving part including a plurality of magnetic teeth arranged side by side along the motor running direction and coils wound around the individual magnetic teeth;

wherein each of the magnetic teeth is formed of multiple magnetic tooth elements held in contact with one another and arranged in tandem in a direction perpendicular to the motor running direction, and each of the coils is wound around said multiple magnetic tooth elements to join them together into a single structure.

* * * * *